Nov. 13, 1962 E. WEINBRENNER ETAL 3,063,813
APPARATUS FOR PRODUCING FLUID MIXTURES
Filed Aug. 5, 1958 2 Sheets-Sheet 1

INVENTORS:
ERWIN WEINBRENNER, PETER HOPPE, KARL BREER.
BY
Burgers, Dinklage & Sprung
ATTORNEYS Nov. 13, 1962  E. WEINBRENNER ETAL  3,063,813
APPARATUS FOR PRODUCING FLUID MIXTURES
Filed Aug. 5, 1958  2 Sheets-Sheet 2

INVENTORS:
ERWIN WEINBRENNER  PETER HOPPE  KARL BREER
BY
Burgess, Dinklage & Sprung
ATTORNEYS United States Patent Office 3,063,813
Patented Nov. 13, 1962

3,063,813
APPARATUS FOR PRODUCING FLUID MIXTURES
Erwin Weinbrenner, Leverkusen-Bayerwerk, Peter Hoppe, Troisdorf, and Karl Breer, Koln-Flittard, Germany, assignors to Farbenfabriken Bayer Aktiengesellschaft, Leverkusen, Germany, a corporation of Germany
Filed Aug. 5, 1958, Ser. No. 753,238
Claims priority, application Germany Sept. 10, 1957
14 Claims. (Cl. 23—252)

The invention relates to an apparatus for producing reactive and unreactive liquid mixtures using a piston measuring chamber into which the components to be mixed are either introduced at the same pressure, homogenized and discharged, or into which the components to be homogenized are introduced in the piston head or cylinder bottom by a continuous or intermittent injection of the component of low viscosity into the continuously or intermittently flowing stream of the component or component mixtures of high viscosity, using appreciable delivery pressure differences, homogenized and discharged.

A disadvantage in respect of the metered handling of raw materials for plastics when using the mixing systems described above is that, with a simple stirrer system with a bottom valve, introduction into narrow filling openings of moulds or hollow bodies is not possible without a piston ejection system and also that, with the piston ejection system which has been described above, adequate homogeneity, especially with highly viscous components, when the components are mixed in the piston head is not guaranteed.

It is an object of the invention to overcome the foregoing disadvantages and to provide a simple process and apparatus for readily and efficiently producing reactive and unreactive homogeneous liquid mixtures.

Other and further objects of the invention will become apparent from a study of the within specification and accompanying drawing, in which FIG. 1 is a diagrammatic sectional view of a piston chamber arrangement in accordance with one embodiment of the invention, showing the agitator means depending from the piston head;

Figures 1, 2, 3:
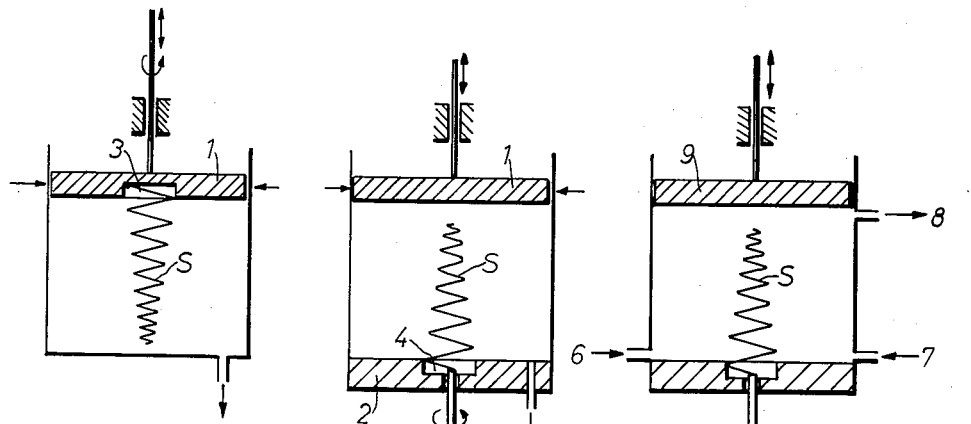
FIG. 2 is a view similar to that of FIG. 1, showing another embodiment, wherein the agitator means upwardly extends from the chamber bottom.
FIG. 3 is a view similar to FIG. 2, wherein the device of the invention is used for continuous mixing, the piston remaining stationary.

It has now been found to be possible to effect very good homogenization of the reaction components introduced separately into the cylinder space from below, or to obtain favourable final mixing in the cylinder space of the components which are already initially mixed in the piston head, by providing a spiral spring agitator which is either mounted in the piston head or arranged in the cylinder bottom. Conical spiral wire springs, flat spirals and spring strip spirals may be used as spiral spring agitators. After the final mixing has been carried out mechanically, the spiral agitator is compressed by the movement of the piston for the ejection process and is forced into a recess in the piston head or cylinder bottom. It is possible in this way to effect complete emptying of the cylinder space with the downward movement of the piston. A very important consideration for keeping the mixing chamber clean consists in that, on the compression of the spiral agitator, the convolutions of the latter are disposed quite closely adjacent one another and thus any quantities of the mixture disposed therebetween are squeezed out.

The reactive components can either be injected into the piston head or into the cylinder bottom. The discharge of the homogenized reaction mixtures takes place through a discharge opening which is arranged laterally in the cylinder bottom and which is equipped with a slotted slide valve.

The apparatus according to the invention can also be used for continuous mixing of the reaction components, in which case the piston is fixed and, by introducing the reaction components mainly from below, the mixture completely homogenized by the spiral agitator is discharged from an outlet opening arranged at the top of the mixing chamber.

The system according to the invention can be used for polyurethane plastics which consist of polyesters or polyethers or other polyesters containing primary and/or secondary OH groups, which are reacted with diisocyanates, with or without catalytic acceleration. Homogeneous or porous plastics of hard to elastic consistency can be obtained in this way. The apparatus according to the invention is also suitable for continuous or intermittent production of products which can be cast and which have a base of polyester resins, epoxide resins or combinations of epoxide resins with diisocyanates, and for polyvinyl chloride pastes. The apparatus also permits of the production of reaction mixtures for latex foam materials and the like. The additional incorporation of fillers of all types, colouring pastes or protective agents is also provided for.

The apparatus according to the invention can also be so designed that it is possible for continuous or intermittent preparation, preferably when using 3-component systems, to work with two mixing systems which are connected in series and are operated continuously or in a cycle. It is, for example, possible in connection with polyurethane plastics, for combinations of polyesters with activators to be produced in a first mixing system and for this mixture to be fed into a second mixing system into which the residual component, for example toluylene diisocyanate, is supplied. There is also the possibility of carrying out an addition between polyester and isocyanate in the first mixing system and to supply the third component, that is to say the activator, to this addition product in the second system. This combined apparatus or the simple system can be so operated that a length of stay required to achieve certain reaction conditions can be chosen to meet requirements; for continuous operation the piping length between the two mixing systems is chosen to correspond to the course of the reaction and for intermittent operation the length of time of the cycles determines the length of stay.

The piston ejection apparatus according to the invention also permits of the velocity of the reaction being retarded with controlled lengths of stay and particularly in connection with foam materials with a polyurethane base, the retardation of the progress of the reaction in the closed and completely filled cylinder space is brought about by the increase in pressure when the evolution of $CO_2$ starts. The actuation of the opening valve can be controlled through the temperature produced by the reaction.

It has also been found that the piston ejection apparatus equipped with a spiral agitator can be used for the measured discharge of copolymers, lacquer mixtures, adhesive mixtures, mixtures of two or three initial components (for example polyester-activator mixtures) for latex foam materials, and dispersions and emulsions of all types. Furthermore, storable polyurethane combinations for the production of homogeneous or porous plastics which are finally reacted by subsequent heating action can also be produced.

Fillers can also be introduced into the mixing chamber, and there is also the possibility of gases (for example $CO_2$) or air also being introduced. The introduction of gases into the mixing chamber takes place by way of frits, so that on the discharge of the reaction mixtures after a certain length of stay in the mixing chamber, creamy mixtures may be discharged.

Figures 4, 6:
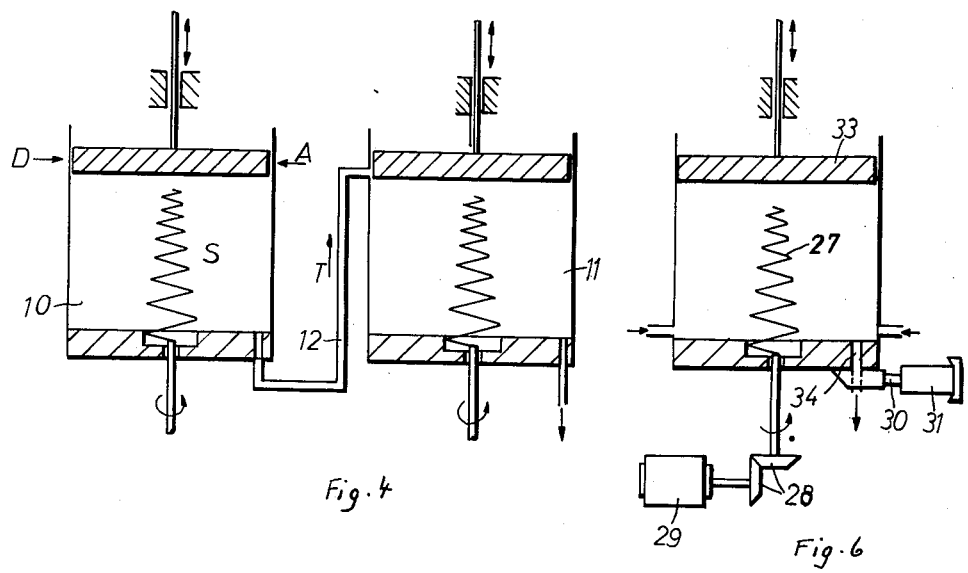
FIG. 4 is a further diagrammatic sectional view, showing two devices of the invention connected for series operation.
FIG. 6 is a view showing in larger detail the piston chamber arrangement in the embodiment of FIG. 5.

Embodiments of the arrangement according to the invention are shown diagrammatically by way of example in the drawing. FIGURE 1 shows the arrangement of the spiral agitator S in the piston head 1, while FIGURE 2 shows it arranged in the bottom end 2 of the cylinder. The arrangement of the agitator S in the cylinder bottom 2 is more desirable, since the actuating means 5 of the spiral agitator S can be more easily mounted than that of the agitator in the piston head. On actuating the piston 1, the spiral agitator which continues rotating disappears into the recesses 3 and 4 arranged in the piston head and cylinder bottom, respectively. The arrows indicate the inlet directions of the components and the direction of discharge of the prepared mixture from the cylinder. FIGURE 3 shows an arrangement suitable for continuously mixing the components by means of the spiral agitator S. In this case, the components 6 and 7 to be mixed enter from below and leave the cylinder chamber at 8 while the piston 9 is stationary. FIGURE 4 shows the combination of two mixing systems. In this case, for example two components A and D can be supplied in the first piston system 10, while homogenization with the third component T takes place in the piston system 11. The connecting pipe line 12 between the two stirrer systems 10 and 11 can be made exactly of the length to conform to the choice of the composition in order to maintain desired lengths of stay where necessary.

Figure 5:
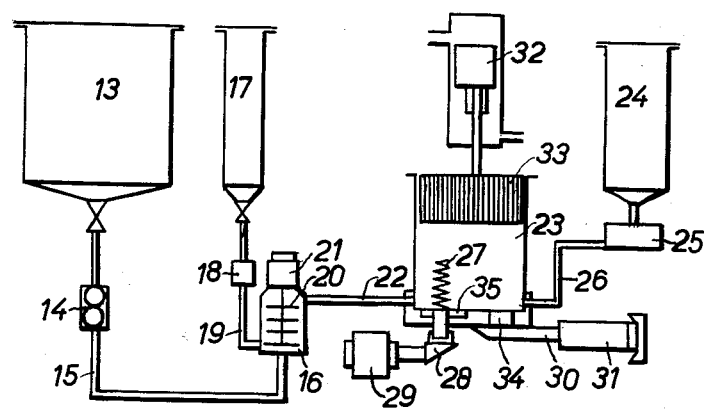
FIG. 5 is a still further schematic view of another embodiment of the invention.

FIGURE 5 and FIGURE 6 show the construction of an intermittent machine with a built-in spring agitator 27.

The main component, for example polyester, is supplied from the container 13 by means of the delivery pump 14 through the pipe 15 to the pre-mixing chamber 16. Simultaneously, the activator mixture is introduced into the bottom part of the pre-mixing chamber 16 from the container 17, this being effected by means of an activator pump 18 by way of the pipe 19. The pin-type agitator 20 is driven by a motor 21 and provides for the homogenization. The mixture travels by way of the pipe 22 into the lower part of the ejection chamber 23. The third component, for example isocyanate, is simultaneously introduced from the container 24 by means of the pump 25 and by way of the pipe 26 into the lower part of the ejection chamber 23. During the delivery into the ejection chamber 23, the liquids are homogenized by the spring-type agitator 27, which is driven by the motor 29 by way of bevel gears 28. The delivery of the separate components 13, 17 and 24 is continued until an adjustable volume is reached in the ejection chamber. The spring agitator 27 is then switched off and the flat slide-valve 30 is opened through the magnetic valve 31. The homogeneous mixture is ejected from the chamber 23 through the outlet passage 34 by means of the hydraulic piston 32 and the downwardly moving ejection piston 33. By movement of the piston 33 into the lower dead-center position, the conical spring agitator 27 is forced into the recess 35, so that the reaction mixture can be completely ejected.

We claim:
1. An apparatus for producing fluid mixtures, including a piston chamber arrangement into which the components to be mixed are introduced, homogenized and thereafter discharged, the improvement which comprises means defining a compressible resilient spiral agitator having a constantly unidirectionally changing spiral radius along the axial extent thereof, one end of said agitator means being positioned in a recess defined in such piston chamber arrangement at one axial end of the piston chamber arrangement, the other end of said agitator means being free and normally extending into the chamber of said arrangement and upon compression of the piston of said arrangement resiliently compressing within said recess and substantially completely occupying the space in said recess.

2. In an apparatus for producing reactive and unreactive liquid mixtures in a piston chamber, into which the components to be mixed are introduced, homogenized and thereafter discharged, the improvement which comprises means defining a piston and cylinder chamber and means defining a compressible resilient spiral agitator having a constantly unidirectionally changing spiral radius along the axial extent thereof, one end of said agitator means being positioned in a recess defined in said piston and cylinder chamber means at one longitudinal end thereof, the other free end of said agitator means normally extending into the chamber of said piston and cylinder chamber means and upon compression of said piston means resiliently compressing within said recess and substantially completely occupying the space in said recss.

3. In an apparatus for producing reactive and unreactive liquid mixtures in a piston chamber, into which the components to be mixed are introduced, homogenized and thereafter discharged, the improvement which comprises means defining a piston and cylinder chamber and means defining a compressible spiral spring agitator having a constantly unidirectionally changing spiral radius along the axial extent thereof, one end of said agitator means being rotatably positioned in a recess defined in said piston and cylinder chamber means, the other free end of said agitator means normally extending into the chamber of said piston and cylinder chamber means in the direction of travel of the piston means thereof and upon compression of said piston means substantially completely compressing within said recess, whereby the contents within said chamber may be substantially completely discharged.

4. Improvement according to claim 1, wherein the piston measuring chamber arrangement includes a piston head and said recess is defined therein.

5. Improvement according to claim 1, wherein the piston measuring chamber arrangement includes a piston cylinder bottom and said recess is defined therein.

6. Improvement according to claim 1, wherein said agitator means is defined by a helical spring means.

7. Improvement according to claim 6, wherein said spring means is defined by a wire.

8. Improvement according to claim 6, wherein said spring means is defined by a flat strip.

9. Improvement according to claim 6, wherein said spring means has a polygonal cross-section.

10. Improvement according to claim 6, wherein said spring means has a round cross-section.

11. Improvement according to claim 6, wherein said spring means has a square cross-section.

12. Improvement according to claim 6, wherein said spring means upon compression of said piston is substantially completely telescoped within said recess, said recess being substantially completely occupied therewith, whereby the mixture contents within said recess may be substantially completely displaced therefrom and discharged.

13. Improvement according to claim 1, wherein at least two of said piston chamber arrangements, each having said agitator means positioned in a recess therewithin, are connected in series.

14. Improvement according to claim 1, wherein said agitator means is rotatable.

References Cited in the file of this patent

UNITED STATES PATENTS

| | | | |
|---|---|---|---|
| 895,845 | Comstock | | Aug. 11, 1908 |
| 2,885,268 | Breer et al. | | May 5, 1959 |

FOREIGN PATENTS

| | | | |
|---|---|---|---|
| 531,213 | Germany | | Aug. 7, 1931 |
| 612,636 | Germany | | Apr. 30, 1935 |